Sept. 16, 1969  D. GLÄSER  3,466,678
BED FOR BABY CARRIAGE

Filed Sept. 20, 1967  3 Sheets-Sheet 1

INVENTOR.
DIETER GLÄSER
BY
Woodhams, Blanchard & Flynn
ATTORNEYS

Sept. 16, 1969       D. GLÄSER       3,466,678
BED FOR BABY CARRIAGE
Filed Sept. 20, 1967       3 Sheets-Sheet 2

INVENTOR.
DIETER GLÄSER
BY
Woodhams, Blanchard & Flynn
ATTORNEYS

Sept. 16, 1969  D. GLÄSER  3,466,678
BED FOR BABY CARRIAGE
Filed Sept. 20, 1967  3 Sheets-Sheet 2

INVENTOR.
DIETER GLÄSER
BY
Woodhams, Blanchard & Flynn
ATTORNEYS

United States Patent Office 3,466,678
Patented Sept. 16, 1969

3,466,678
BED FOR BABY CARRIAGE
Dieter Gläser, Garching, near Munich, Germany, assignor to Peggy Munchener Kinderwagenfabrik G.m.b.H., & Co., KG, Munich, Germany
Filed Sept. 20, 1967, Ser. No. 669,196
Claims priority, application Germany, Apr. 13, 1967, P 41,883
Int. Cl. A47d 7/00
U.S. Cl. 5—93                                   7 Claims

ABSTRACT OF THE DISCLOSURE

A bed for a baby carriage having a substantially horizontal bed plate member movably mounted on a rigid base frame extending therearound. The bed plate member is connected to the base frame by means of a support linkage which permits the bed to be positioned at different elevations relative to the frame. The support linkage comprises a plurality of bars pivotally connected at one end thereof to the base frame, the other ends of the bars being received in slotted guide members connected to the bed plate to permit the plate to be raised or lowered relative to the frame. Alternatively, telescopic rods or toggle linkages can be used to interconnect the bed plate member to the base frame. Flexible sidewall members preferably interconnect the base frame to the bed plate member.

---

Figure 1:
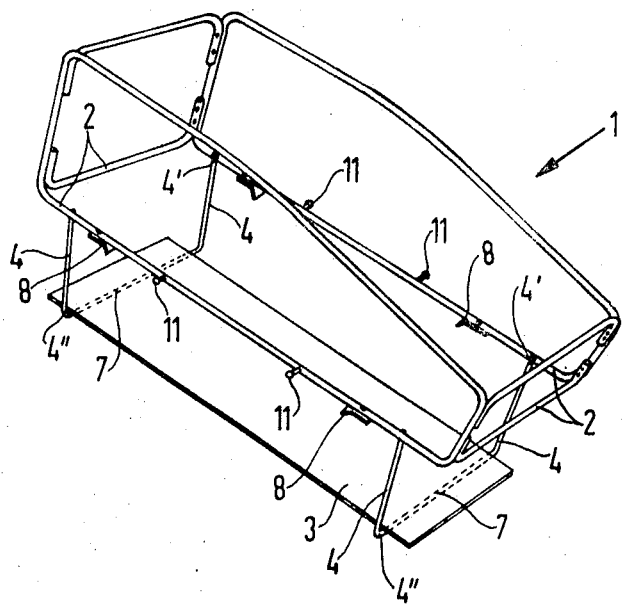

This invention relates to a bed for a baby carriage.

The bed of modern baby carriages in which the baby is placed has relatively low walls. This has the advantage that the inside of the bed is easily accessible from all sides and that the baby lying in the bed can therefore be easily taken care of. However, as soon as a baby reaches the age when it gets up alone in the bed of the baby carriage, there is the danger that the baby might fall over one of the low walls of the bed out of the baby carriage in a moment when no one is looking after the baby. To strap the baby in the flat bed to prevent it from falling out is, according to doctors, not healthy because the blood circulation is disturbed.

The basic purpose of the invention is to construct a baby carriage which, to increase the safety for a baby in the bed, makes it possible to increase the height between the bed plate and the upper edges of the bed walls in a simple and fast manner, and which baby carriage is of a simple, strong and lasting structure.

To attain said purpose the invention provides that the bed has a rigid base frame supporting the bed walls extending therearound. The base frame has a bed plate mounted thereto by means of a holding and lowering device, the bed plate being movable by means of the holding and lowering device from a normal position at the same height as the base frame to a lowered position beneath the base frame.

The baby carriage of the invention makes it possible, by lowering the bed plate and by holding the bed plate in its lowered position, to increase the space between the upper edges of the walls of the bed and the bed plate so that the danger for a child falling out of the bed is prevented. The baby carriage of the invention can be constructed in a way that the bed plate is lowered only a relatively small distance, for example 5 cm., so that a child lying in the bed cannot fall out through the opening between the lower edges of the bed walls and the bed plate.

The baby carriage of the invention is advantageously constructed in a way that a wall of flexible material, for example fabric or plastic, is provided between the bed plate and the base frame and extends therearound, the wall being tensioned when the bed plate is in the lowered position and being folded when the bed plate is in the lifted position. The bed plate can, in this embodiment, be lowered a considerable distance because the space between the lower edges of the bed walls and the bed plate is filled out or closed by the flexible walls so that it is impossible for the baby to fall out between the lower edges of the walls of the bed and the bed plate. Moreover, the flexible walls provide the bed plate in its lowered position with an excellent support and prevent a back and forth swinging of the bed plate. In place of a completely closed flexible material, for example a fabric or a plastic foil, a net or a plurality of vertical bands extending at a small distance from one another can be used for connecting the lower edges of the bed walls to the bed plate.

A simple support of the bed plate in its lifted normal position is obtained for the baby carriage of the invention by means of pivoted levers which are arranged for pivotal movement about vertical axes on the bottom side of the base frame, the free end of the levers being movable underneath the bed plate after lifting of the bed plate to its normal position.

A simple, strong and inexpensive construction of the baby carriage of the invention is achieved by providing bars on both sides of the bed plate as a holding and lowering device, each of said bars being pivotably connected to the base frame at its upper end and being movably guided at its lower end in a longitudinal guide provided in each area of the corresponding edge of the bed plate. Each longitudinal guide has at least one lock position for locking the lower end of the bar associated therewith in the lowered position of the bed plate, and the length of each longitudinal guide is measured so that the bar associated therewith is freely swingable by longitudinal movement of its lower end in the guide during lowering or lifting of the bed plate.

An advantageous, simple and structurally light embodiment of the above-discussed structure of the baby carriage of the invention is provided by having each longitudinal guide constructed as a metallic profiled band member which extends spaced away from but parallel to the underside of the bed plate and which is secured at both ends thereof to the bed plate, the band member extending in the area of one end in a semicircle directed away from said bed plate so as to provide a lock position. The lower end of the bar associated with each band member has a rectangular projecting extension which extends between the bed plate and the band member and which slides into the opening therebetween.

A further embodiment which assures quick handling of the above-described baby carriage of the invention is provided by having two bars pivoted to the oppositely positioned parts of the bed frame and being opposite from each other, the bars being connected at their lower ends by a crossbar which extends between the band profiled members underneath the bed plate. In this manner, two oppositely positioned bars are each moved at the same time by one operation and are always parallel to each other, resulting in a very steady movement of the bed plate without any blocking and distortion.

In order to make possible a lowering of the bed plate in several steps and a securing of same at several different heights, the baby carriage of the invention is advantageously provided with longitudinal guides having several spaced-apart lock positions for holding the lower end of the bar associated therewith. The height level of the bottom of the bed can, in this embodiment, be adjusted stepwise according to the age or mobility of the baby lying in the bed.

A still further embodiment of the baby carriage of the invention advantageously provides telescopic bars on both longitudinal sides of the bed plate as a holding and lowering device, each of said bars being pivotably connected at its upper end to the base frame and at its lower end to the bed plate. The pivot point of the lower end of each telescopic bar is laterally offset on the bed plate with respect to the pivot point of the upper end on the base frame so that each telescopic bar extends inclined in the lowered position of the bed plate. This embodiment does not require any guides for the lower ends of the telescopic bars but the telescopic bars are pivoted to the bed plate. Upon lifting of the bed plate, the single parts of each telescopic bar are moved into one another so that the telescopic bar becomes shorter as required.

Another advantageous embodiment of the baby carriage of the invention provides toggle joints on both longitudinal sides of the bed plate as a holding and lowering device, each of which has one free end pivoted to the base frame and the other free end pivoted to the bed plate. Guides for the lower ends of the toggle joints are also not required in this embodiment since same are pivotably connected to the bed plate. Thus, the underside of the bed plate, like in the embodiment with the telescopic bars, is free of fittings or guides. Upon lifting of the bed plate, the toggle joints bend and are placed in a bent position between the base frame and the edge of the bed plate. A stepwise lowering of the bed plate into several different positions is, however, not possible by using toggle joints or telescopic bars as a holding or lowering device.

Figure 4:
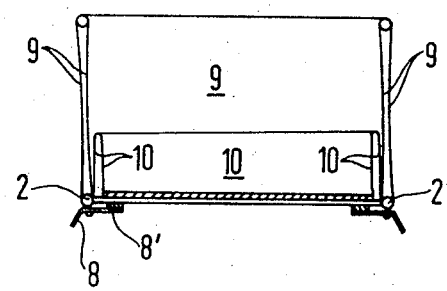
Figure 2:
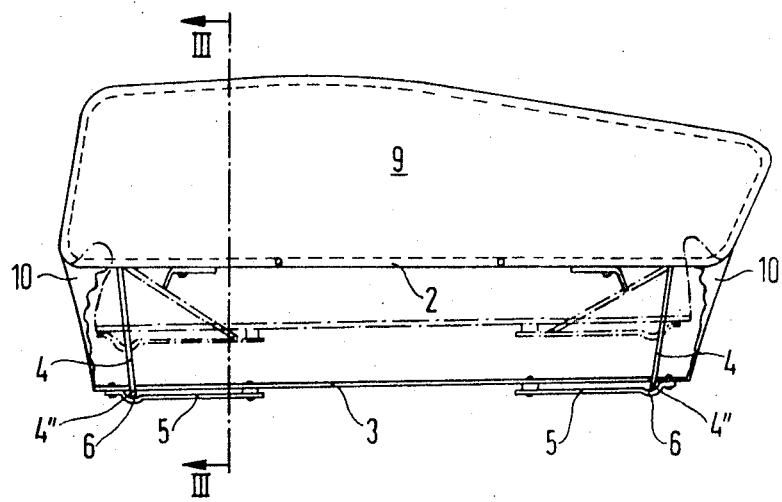
Figure 3:
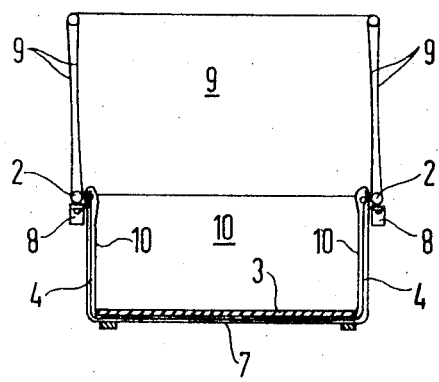
Figure 5:
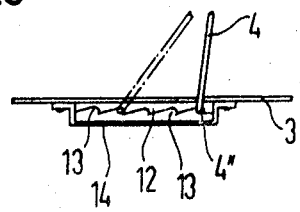
Figure 6:
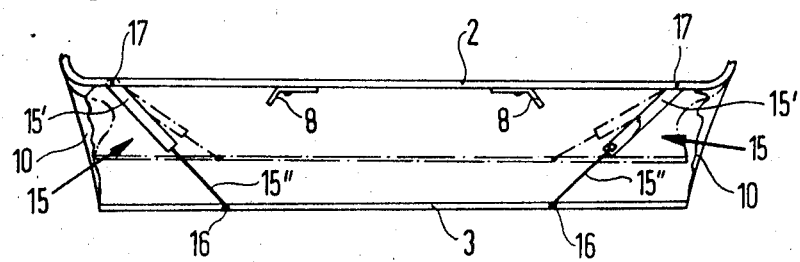
Figure 7:
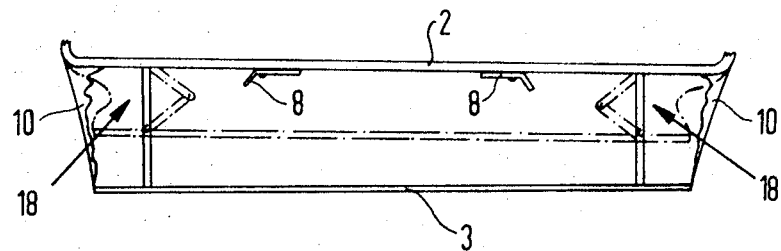

Further advantages and characteristics of the invention are disclosed hereinafter in the description of several embodiments of the baby carriage of the invention in connection with the accompanying drawings, in which:

FIGURE 1 is a perspective illustration of a first embodiment of the bed of a baby carriage according to the invention, FIGURE 2 is a side-elevational view of the bed according to FIGURE 1, FIGURE 3 is a cross-sectional view of the bed according to FIGURE 2 along the lines III–III of FIGURE 2 whereby the bed plate is in its lowered position, FIGURE 4 is a cross-sectional view similar to FIGURE 3 showing the bed plate in its normal lifted position, FIGURE 5 is a second embodiment illustrating a longitudinal guide for a bar of a holding and lowering device of a baby carriage of the invention, FIGURE 6 is a partial side elevational view of a third embodiment of a bed of a baby carriage according to the invention, and FIGURE 7 is a partial side elevational view of a fourth embodiment of a bed of a baby carriage according to the invention.

FIGURE 1 illustrates in a first embodiment a bed of the baby carriage according to the invention. The bed 1 comprises a base frame 2 and framework for the sidewalls, all of tubular construction. The tubular elements which form the framework for the sidewalls of the bed 1 are covered with a flexible material, for example, a fabric or a plastic foil. The covering is not illustrated in FIGURE 1 for clarification purposes. A bed plate 3 is connected to the tubular elements of the base frame 2 by means of a holding and lowering device. The bed plate 3 can be moved from a normal position at the same level as the base frame 2, in which position said plate fills out the area within the base frame 2, into a lowered position beneath the base frame 2 by means of the holding and lowering device and can be held in said lowered position. The lowered position is illustrated in FIGURES 1 and 3 and in full lines in FIGURE 2.

Two bars 4 are provided on each of the two oppositely positioned longitudinal sides of the bed plate 3 and function as a holding and lowering device, the upper end 4' of each bar being pivotably connected to the base frame 2 and the lower end of each of said bars being movably guided in a longitudinal guide provided in the area of the corresponding edge of the bed plate 3. As illustrated in FIGURE 2, each longitudinal guide is constructed as a metallic profiled band member 5 extending in spaced parallel relationship to the underside of the bed plate and being secured at both ends to the bed plate 3, the metallic band member 5 extending away from said bed plate 3 in a small groove or semicircle 6 in the area of one end. Each semicircle 6 is used as a lock for locking the lower end 4" of the respective bar 4 when the bed plate 3 is in the lowered position. The lower end 4" of each bar 4 has a rectangularly projecting extension which extends between bed plate 3 and band member 5 and which slides in the space or slot therebetween. In the embodiment of the bed according to FIGURES 1 to 4, there are two bars 4 each connected at their lower ends by a crossbar 7 (FIGURES 1 and 3), said bars 4 being pivoted to opposite sides of the base frame 2. The crossbar 7 extends between the band member 5 and the bed plate 3 and passes underneath said bed plate. The length of the longitudinal guides formed by the band members 5 for the lower ends 4" of the bars 4 is measured in a way that the bars 4 are freely swingable upon lowering or lifting of the bed plate 3 by longitudinal movement of the lower ends 4" within the guide slot.

Levers 8 are pivoted about vertical axes on the bottom side of the base frame 2. After lifting the bed plate into the normal position, the rocker levers 8 are angularly pivoted into a position substantially transverse to the tubular side elements of the base frame 2 whereby the free ends 8' are positioned underneath the bed plate 3 (FIGURE 4) and in this manner, reliably hold the bed plate in the normal position.

FIGURES 2 to 4 illustrate the sidewalls 9 of the bed which are made of two layers of a flexible material. FIGURES 2 to 4 also illustrate that a wall 10 extending around the entire periphery is provided between the bed plate 3 and the base frame 2, the wall 10 being of a flexible material, for example, fabric or plastic foil, and being tensioned when the bed plate is in its lowered position (FIGURE 3) and being folded when the bed plate is in its lifted position (FIGURE 4).

The wall 10 between the base frame 2 and the bed plate 3 is not illustrated in FIGURE 2 to allow a better understanding. Aside from the completely lowered position of the bed plate 3 illustrated in full lines, FIGURE 2 also illustrates in dash-dotted lines an interphase of the movement of said bed plate 3 on its way to the lifted normal position. The folding of the wall 10 in the upward direction is also illustrated in dash-dotted lines. As illustrated in FIGURE 2, the wall 10 in addition supports the bed plate 3 in its lowered position and prevents a back-and-forth swinging of said bed plate 3 about the pivot bars 4.

FIGURES 1 and 4 illustrate a bed, the sidewalls of which are constructed as tubular frames covered with flexible material and which sidewalls can be releasably mounted on a frame of a baby carriage, not illustrated, by means of a pin 11. However, it is also possible to make the sidewalls of the bed of a stiff plate material, for example, of wood or plastic plates, and to connect said sidewalls fixably or releasably with the frame of a baby carriage.

FIGURE 5 illustrates in a second embodiment a longitudinal guide for the lower end 4" of a bar 4 of a baby carriage of the invention. Apart from the detail illustrated in FIGURE 5, the baby carriage can, like the second embodiment, correspond entirely in its structure to the baby carriage discussed hereinabove with reference to FIGURES 1–4. Each longitudinal guide according to FIGURE 5 is mounted to the bottom side of the bed plate 3 in place of the longitudinal guide illustrated in FIGURE 2. Each longitudinal guide comprises a profiled member 12 which has several lock positions 13 arranged spaced away from each other and being provided to secure in position the lower end 4" of the respective bar 4. A metallic band member 14 extends parallel to the profiled member 12 and spaced away therefrom, which band member 14 prevents a falling off of the lower end 4″ of the respective bar 4 from the longitudinal guide. All parts of the longitudinal guide can be secured to the bed plate 3 by means of screws or rivets. The longitudinal guide of FIGURE 5 makes it possible for the plate 3 to be lowered in several steps and thus makes is possible to adjust the distance or height of the bed plate from the upper edge of the walls of the bed corresponding to the age and the mobility of the child.

FIGURE 6 illustrates a partial side elevational view of a third embodiment of a bed of a baby carriage of the invention. The structure of this baby carriage of the invention may correspond to the structure of the baby carriage according to FIGURES 1-4 if said structure is not discussed in detail hereinbelow. In the third embodiment, telescopic bars 15 are provided as a holding and lowering device on both longitudinal sides of the bed plate 3, the upper end of each of the telescopic bars being pivotally connected to the base frame 2 and the lower ends being pivotally connected to the bed plate 3. Each telescopic bar, which is illustrated in cross section on the right side of FIGURE 6, comprises a tubular casing 15′ and a rod 15″ slideably movable therein. Each rod 15″ has a reinforcement on its upper end which, when the telescopic bar is completely pulled out, comes to rest on an inwardly projecting annular flange at the lower end of the tubular casing associated therewith. In this manner, each bar is telescopic to a certain predetermined length. The pivot point 16 of the lower end of each telescopic bar 15 on the bed plate 3 is, relative to the pivot point 17 of the upper end, laterally offset so that each telescopic bar extends at an inclination when the bed plate is in the lowered position. This assures a simple and smooth lifting and lowering of the bed plate. The parts illustrated in FIGURE 6 which correspond to parts of FIGURES 1-4 are identified by the same reference numerals.

FIGURE 7 illustrates a partial side elevational view of a bed of a baby carriage of the invention according to a fourth embodiment. Here it is also the case that the structure of the baby carriage can correspond to the structure of the baby carriage of FIGURES 1-4 if said structure is not discussed more in detail hereinbelow. Parts of FIGURE 7 which correspond to parts of FIGURES 1-4 are provided by the same reference numerals. The baby carriage according to the fourth embodiment has toggle joints 18 provided on both longitudinal sides of the bed plate 3 as a holding and lowering device. Each one of said toggle joints is pivoted with one free end to the base frame 2 and with its other free end to the bed plate 3. FIGURE 7 illustrates in full lines the completely lowered position of the bed plate. A transition stage of the movement of the bed plate from its lowered position to its lifted normal position is illustrated in dash-dotted lines. This illustration also shows the bending movement of the toggle joints 17 during lifting of the bed plate.

According to the embodiments of FIGURE 6 and FIGURE 7, securing the bed plate 3 in the lifted normal position is done by means of rocking levers 8 which are pivoted to the base frame 2 as has been already described.

The operation of said baby carriage of this invention can be easily understood from the described embodiments. Lifting and lowering of the bed plate can be done in a very short period of time by one person by means of only a few manipulations. Depending on the construction of the bed of the baby carriage of the invention and on the dimensions of the holding and support device, the bed plate can be lowered so far that the distance between the bed plate in the lowered position and the upper edges of the bed walls is so great that a small child can then stand in the bed. Thus, the bed can be used as a walking school for the baby.

In the embodiments of FIGURES 1-7, the bars 4 or the telescopic bars 15 or the toggle levers 18 extend outside the wall 10 between the base frame 2 and the bed plate 3. However, it is possible to provide outside of the bars 4 or the telescopic bars 15 or the toggle levers 18 a further wall of flexible material extending all around and hanging down from the base frame, which wall covers the parts of the holding and lowering device from the outside. It is also possible to connect the lower edge of said outer wall to the bed plate 3 whereby slots must be provided in the embodiment according to FIGURES 1-4 to assure a movability of the bars 4.

The invention is not limited to the embodiments disclosed hereinabove. It is for example possible to construct the bars or telescopic bars or toggle levers shorter on one end of the bed than on the other end and thus to allow a lowering of the bed plate into an inclined position. It is also possible to provide more than four bars or telescopic bars or toggle levers. The telescopic bars and toggle levers need not necessarily be arranged exclusively on the longitudinal sides of the bed but can be provided at all four sides of said bed. The same is true for the single pivoted rods. It is further possible to provide upwardly directed walls on the bed plate, which walls together with the bed plate form an upwardly open box-like structure. Said structure can then be lifted or lowered in a telescopical manner inside the actual walls of the bed. The walls to be mounted on the bed plate can also be made of a stiff material so that in the lowered position the space between the lower edges of the walls of the bed and the bed plate is covered by rigid walls.

The embodiments of the invention in which an exclusive property or privilege is claimed are defined as follows:

1. A baby carriage bed supported on a frame comprising a bed having a rigid base frame and an upper frame secured thereto and extending around the bed, said base frame having mounted thereto a bed plate by means of a holding and lowering device, sidewalls for said bed secured between the frames and the bed plate, said bed plate being guided by means of the holding and lowering device from a normal position substantially at the same height as said base frame to a position spaced below the base frame.

2. A baby carriage as defined in claim 1, wherein rocking levers are pivoted about vertical axes on the bottom side of the base frame, which levers after lifting of the bed plate into the normal position are swingable underneath the bed plate with one free end of each lever holding the bed plate in the normal position.

3. A baby carriage bed supported on a frame comprising a bed having a rigid frame extending therearound and having sidewalls for the bed, a bed plate secured to the base frame on at least two sides thereof by bars, the bed plate being guided by the bars from a normal position substantially at the same height as the base frame to a lowered position spaced below the base frame, each one of the bars being pivoted at its upper end to the base frame and being movably guided along each of its lower ends by means of longitudinal guides provided on the corresponding edges of the bed plate, each longitudinal guide having at least one lock position for locking the lower end of the bar associated therewith in the lowered position of the bed plate, and the length of each longitudinal guide being measured so that the bar associated therewith is freely swingable in the guide by the longitudinal movement of its lower end during lowering or lifting of the bed plate.

4. A baby carriage as defined in claim 7, wherein each longitudinal guide is constructed as a profiled member parallel to and spaced away from the bottom side of the bed plate with both ends being mounted to the bed plate, said profile member providing a lock position in the area of one end by means of a small semicircular directed of one end by means of a small semicircle directed away from the bed plate, and the lower end of the bar associated therewith having a projecting extension extending between the bed plate and the profiled member and being slideable therebetween.

5. A baby carriage as defined in claim 4, wherein two oppositely positioned bars are pivoted to oppositely positioned parts of the bed frame and are connected at their lower ends by a transverse bar which extends between the profiled members adjacent the bed plate edges and underneath the bed plate.

6. A baby carriage as defined in claim 7, wherein each longitudinal guide has several lock positions spaced apart from each other for locking the lower ends of the bar associated therewith.

7. A baby carriage bed, comprising a support having an upper frame spaced apart from a lower frame, a bed plate secured to the support and supported for vertical movement between a position flush with the base frame and a position spaced below the base frame, guide means on the bed plate for regulating the desired vertical spacing between the upper frame and the bed plate, flexible sidewall material secured to the upper frame and the base frame around the periphery thereof, the flexible sidewall material being further secured to the bed plate around the periphery thereof, whereby the bed plate can be raised and lowered as desired to regulate the spacing between the upper frame and the bed plate, the flexible sidewall material between the base frame and the bed plate flexing to accommodate the spacing therebetween.

References Cited

UNITED STATES PATENTS

| | | | |
|---|---|---|---|
| 2,599,296 | 6/1952 | Toomey et al. | 5—11 |
| 2,968,817 | 1/1961 | Jacobs et al. | 5—93 X |
| 3,300,828 | 1/1967 | Hegman et al. | 5—11 X |
| 3,309,719 | 3/1967 | Bader et al. | 5—93 X |

CASMIR A. NUNBERG, Primary Examiner

U.S. Cl. X.R.

5—98